May 3, 1949. P. SPENCE 2,469,057
SAFETY DEVICE FOR TEMPERATURE REGULATORS
Filed June 26, 1943
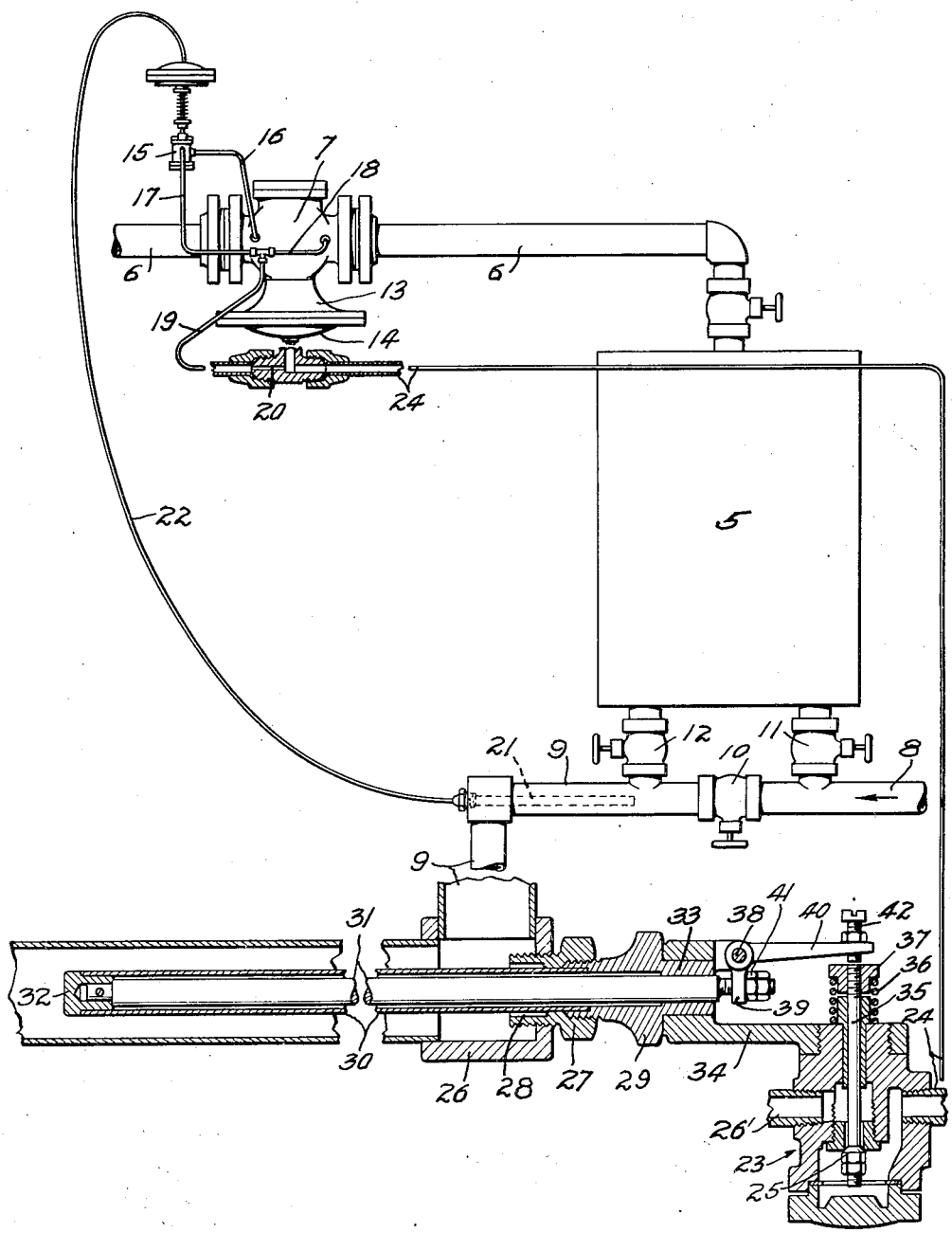
INVENTOR
Paulsen Spence
BY
ATTORNEY Patented May 3, 1949

2,469,057

UNITED STATES PATENT OFFICE 2,469,057

SAFETY DEVICE FOR TEMPERATURE REGULATORS

Paulsen Spence, Hot Springs, Ark., assignor to Spence Engineering Company, Inc., Walden, N. Y., a corporation of New York Application June 26, 1943, Serial No. 492,386

4 Claims. (Cl. 236—21)

My invention relates to a temperature regulator and in one of its more specific aspects relates to a safety device for preventing an oversupply of heating medium to a heater or the like.

The invention will be described as embodied in a hot water heater, but the principles of the invention are of broader application and the invention and various features thereof may be used in connection with other apparatus.

The drawing is a more or less diagrammatic representation of a heater equipped with apparatus, illustrative of the invention, parts being shown in section and parts broken away.

In the form shown, a heater 5, which may be a hot water heater and of the indirect or other type, is supplied with heating fluid such as steam entering through the pipe 6. The quantity of steam entering the heater is controlled by a main valve 7 to be later referred to. Fluid to be heated, such as water, may enter the heater through pipe 8 and leave the heater through pipe 9. Under normal operating conditions, the stop valve 10 would be closed and the stop valves 11—12 would be open, all as will be readily understood.

The main valve 7 is actuated in at least one direction, and preferably in the opening direction, by fluid pressure actuated means and may be and preferably is of the type illustrated in my Patent No. 1,995,949, March 26, 1935, to which patent reference is hereby made for a fuller disclosure of details of the valve. It will suffice to say here that the valve actuating means includes a fluid pressure actuated member, such as a diaphragm held between the hood 13 and the bonnet 14, as shown more particularly in my aforesaid patent. Upon an increase of pressure beneath the diaphragm, the main valve opens up and admits steam to the heater. Opening of the main valve 7 in the present instance is controlled by a pilot valve 15 which admits pressure fluid through connection 16 from the high pressure side of the valve 7 to the pipe 17, which connects through a T-fitting with a bleed pipe 18 to the low pressure side of the valve and a branch 19 and preferably a bleed connection 20 with the space beneath the main diaphragm.

The pilot valve 15 is preferably controlled by a thermostat 21, which may be located at the outlet side of the heater as in the outlet pipe 9. The thermostat 21 may be of the type which employs a volatile fluid, which upon a rise in temperature volatilizes, and the increased pressure transmitted through the tubing 22 will act on a diaphragm of the pilot valve 15 to more or less close the pilot valve so as to restrict the flow of fluid to the underside of the diaphragm of the main valve 7 and thus tend to close the main valve.

Now, if the pilot valve 15 should get out of order, for instance if the pilot diaphragm should break or the tubing 22 should become ruptured, the pilot valve 15 would move to open position so as to admit the maximum quantity of pressure fluid, and the pressure beneath the diaphragm of the main valve 7 would increase so as to hold the valve 7 wide open. Thus, the maximum supply of steam would be admitted to the heater and either cause damage thereto or so overheat the water or other fluid to be heated so as to make it dangerous to use, for example for domestic purposes in the case of water. I have devised a safety means for preventing the main valve 7 from admitting an excess supply of steam in case of failure of the pilot valve 15 to control the main valve 7 normally.

In the form illustrated, my safety means comprises a safety pilot valve 23, which is designed to vent pressure fluid from beneath the main diaphragm of the valve 7 in case, say, the outlet temperature from the heater rises above a predetermined desirable limit. In the form illustrated, the space beneath the diaphragm of the main valve 7 is connected as by means of tubing 24 with the inlet side of the safety pilot valve 23. When the valve member 25 of the safety pilot is seated, as illustrated in the drawings, the main valve 7 is controlled in normal fashion by means of the normal thermostatic or other pilot valve 15. However, when the valve member 25 is moved from its seat, pressure fluid from beneath the diaphragm of the main valve 7 is vented through the safety pilot 23 and the pressure fluid discharged through pipe 26' to the atmosphere or other zone of low pressure. The safety pilot 23 is controlled by thermostatic means which may be and preferably is positioned so as to be affected by the temperature in the outlet pipe 9. The outlet pipe 9 may embody a fitting such as the elbow 26, and a bushing 27 may be screwed into the elbow and would normally have secured thereto the open end of a tubular well, which would be brazed or otherwise secured in the counterbore 28 of the bushing and would surround the thermostatic elements to be described. The thermostat well has been omitted merely for the sake of clarity and for the further reason that such thermostat wells, connected to bushings, are not new in the art. A second bushing 29 may be screwed into the bushing 27 and the bushing 29 carries or guides the thermostatic elements for actuating the safety pilot 23. In the form shown, a tubular thermostatic member 30 is brazed or otherwise secured to the bushing 29, and a second thermostatic element 31 is connected as by means of a cap or plug 32 to the inner end of the tube 30. The two thermostatic elements 30 and 31 may be formed of different metals or other materials having different coefficients of expansion so that upon change of temperature there will be a movement of the right hand end of the thermostatic element 31 relatively to the bushing 29. The right hand end of the thermostatic element 31 may be guided for relatively free movement in the guide portion 33 of the bushing 29 and longitudinal movement of the right hand end of the thermostatic element 31, which occurs upon change of temperature, is utilized for moving the safety pilot 25 from its seat. A bracket 34 may be securely connected to the bushing 29, as by means of a split bearing or strap arrangement of any well known type. The bracket 34 may carry the body of the safety pilot valve 23 and the valve stem 35 may project up through a suitable stuffing-box to the outside of the valve body. The valve 25 may be normally held closed as by means of a compression spring 36 positioned between the top of the valve body and a collar 37 on the valve stem. The bracket 34 in the present instance carries a pivot or bearing 38 for a bell-crank lever having a short arm 39 and a long arm 40. The short arm 39 may have an opening for the passage of the right hand threaded end of the thermostatic element 31 and a nut 41 may be employed for adjusting the position of the bell-crank lever relatively to the element 31. The long arm 40 may carry an adjustable member such as a screw 42 positioned to engage the valve stem or a part for operating the latter. Thus, upon an increase of temperature the thermostatic element 30 will expand, and since it has a greater coefficient of expansion than the element 31, the right hand end of the latter element will be pulled toward the left so as to rock the bell-crank in a clockwise direction, thus causing the valve stem 35 to be depressed and the safety pilot valve member 25 moved to open position. Upon a lowering of the temperature, the opposite action will take place and the safety pilot valve 25 will be moved to its seat by means of the spring 36. In practice, when the invention is embodied in a heater of the character indicated, the thermostatic means 30—31 is preferably located in the outlet pipe from the heater 5 and the adjustment of the nut 41 and of the screw 42 should be such that while the outlet water temperature is normal the safety pilot valve member 25 will not be moved and the entire control of the main valve 7 will be by the pilot valve 15 and, say, the thermostat 21. However, if for any reason the temperature of the outlet water in the pipe 9 should rise a predetermined amount above the normal desired outlet temperature, the thermostatic device 30—31 and adjustable parts should be set to open the safety pilot valve 23 and thus vent fluid from beneath the diaphragm of the main valve so as to permit the latter to close and thus supply less heating medium to the heater.

It will be seen that I have devised an improved simple means for regulating temperature in a heater or the like. My improved safety pilot means may be employed as a normal pilot instead of merely as a safely pilot. By changing the pivot 38 of the bell-crank or varying the action of valve 23, the valve member 25 may be made to close upon a rise of temperature.

One specific embodiment of the invention and its application have been illustrated, but it is to be understood that many changes may be made both in embodiment and application, all within the scope of the invention as defined in the appended claims.

I claim:

1. In a device of the character indicated, a valve, fluid pressure actuated means for actuating said valve, a thermostatic pilot valve for normally controlling pressure on one side of said fluid pressure actuated means for controlling said main valve, and a second thermostatically actuated valve independent of said pilot valve for quickly venting pressure fluid from said one side of said fluid pressure actuated means, said second thermostatically actuated valve including a valve member directly and positively thermostatically actuable in an opening direction for the purpose described.

2. In a device of the character indicated, a heater, means for conducting heating fluid thereto, means for conducting fluid to be heated to and from said heater, a main valve for controlling the flow of heating fluid to said heater, fluid pressure actuated means for actuating said main valve in at least one direction, pilot valve means for normally controlling pressure on at least one side of said fluid pressure actuated means to hold said main valve in partially open position, a safety pilot valve independent of said first pilot valve for quickly venting pressure fluid from said one side of said fluid pressure actuated means, and thermostatic means subject to the temperature of fluid heated in said heater for opening said safety pilot valve upon the attainment of an abnormally high temperature by said fluid, said thermostatic means including a member directly and positively connected to operate said safety pilot valve in an opening direction.

3. In a device of the character indicated, a water heater, a main valve for controlling the supply of heating medium thereto, fluid pressure actuated means for moving said valve toward open position, a pilot valve for normally controlling the pressure on said fluid pressure actuated means, thermostatic means controlled by the temperature of water heated in said heater for controlling said pilot valve, a second pilot valve independent of said first pilot valve for quickly venting pressure fluid from said fluid pressure actuated means to permit said main valve to close, means for thereafter closing said main valve, and thermostatic means for controlling said second pilot valve, said last named thermostatic means including means directly and positively connected to operate said second pilot valve in an opening direction.

4. In a device of the character indicated, a valve, fluid pressure actuated means for actuating said valve, a first thermostatic pilot valve connected to one side of said fluid pressure actuated means for normally controlling said main valve, and a second thermostatic valve independent of said pilot valve and connected to vent said fluid pressure actuated means, the connection between said fluid pressure actuated means and said pilot valve being more restricted than the vent connection to said second thermostatic valve, and said second thermostatic valve including a valve member directly and positively thermostatically actuable in an opening direction.

PAULSEN SPENCE.

REFERENCES CITED

The following references are of record in the file of this patent:

UNITED STATES PATENTS

| Number | Name | Date |
| --- | --- | --- |
| 607,406 | Coe | July 12, 1898 |
| 1,636,770 | Fox et al. | July 26, 1927 |
| 2,032,046 | Branche | Feb. 25, 1936 |
| 2,161,679 | Kuenhold | June 6, 1939 |
| 2,296,325 | Bak | Sept. 22, 1942 |
| 2,305,933 | Soderberg | Dec. 22, 1942 |

FOREIGN PATENTS

| Number | Country | Date |
| --- | --- | --- |
| 568,868 | Germany | Jan. 25, 1933 |